(12) United States Patent
Sakurai et al.

(10) Patent No.: US 6,780,906 B2
(45) Date of Patent: Aug. 24, 2004

(54) INSULATED ELECTRIC POWER CABLE

(75) Inventors: Takahiro Sakurai, Tokyo (JP); Toshiya Tanaka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/081,003

(22) Filed: Feb. 20, 2002

(65) Prior Publication Data

US 2002/0177638 A1 Nov. 28, 2002

Related U.S. Application Data

(63) Continuation of application No. PCT/JP01/06408, filed on Jul. 25, 2001.

(30) Foreign Application Priority Data

Jul. 26, 2000 (JP) ........................................ 2000-225488

(51) Int. Cl.⁷ .............................. C08K 5/34; B32B 1/08
(52) U.S. Cl. ...................... 524/104; 524/105; 524/210; 428/36.8; 428/36.91
(58) Field of Search .................................. 524/104, 105, 524/210; 428/36.8, 36.91

(56) References Cited

FOREIGN PATENT DOCUMENTS

| EP | 0 579 434 A1 | 7/1993 |
|---|---|---|
| JP | 61-253705 | 11/1986 |
| JP | 62-100909 | 5/1987 |
| JP | 04-368717 | 12/1992 |
| JP | 06-309931 | 11/1994 |
| JP | 08-283470 | 10/1996 |

*Primary Examiner*—Kriellion A. Sanders
(74) *Attorney, Agent, or Firm*—Knobbe Martens Olson & Bear LLP

(57) ABSTRACT

An insulated electric power cable having an insulator layer formed by extrusion-coating and cross-linking a cross-linkable resin composition, which contains a polyolefin blended with a total of 0.05 to 0.4 parts by mass of at least one compound selected from the group of compounds such as N,N'-(4,4'-diphenylmethane)bismaleimide, based on 100 parts by mass of the polyolefin, and a prescribed amount of an organic peroxide cross-linking agent.

5 Claims, No Drawings

INSULATED ELECTRIC POWER CABLE

This is a continuation of PCT Application PCT/JP01/06408, filed Jul. 25, 2001. The prior PCT application was not published in English under PCT Article 21(2).

TECHNICAL FIELD

The present invention relates to an insulated electric power cable.

BACKGROUND ART

Among plastic insulated electric power cables, a cross-linked polyethylene insulated electric power cable, having an insulating layer composed of a cross-linked polyethylene, has various advantages of not only excellent electrical property, mechanical property, and heat-resistance property, but also easy maintenance. Because of these advantages, the cross-linked polyethylene insulated electric power cable is the mainstream type of power-transmission cable. Generally, an insulator layer of the cross-linked polyethylene insulated electric power cable is formed by a method that comprises steps of; extrusion-coating, on a conductor, a cross-linkable resin composition, composed of a low density polyethylene blended with a cross-linking agent, an anti-aging agent, and the like, so as to cover the conductor therewith, and; then heating under pressure, so that the cross-linking agent can be thermally decomposed, to cross-link the resin composition. However, when a direct-current voltage is applied to the cross-linked polyethylene insulated electric power cable, a space electric charge is accumulated in the insulator layer, and a region of high electric field is formed locally. Consequentially, the problem arises that the breakdown voltage considerably decreases.

Several methods are proposed to solve this problem. For example, JP-A-62-100909 ("JP-A" means unexamined published Japanese patent application) discloses that a maleic anhydride-grafted polyolefin is blended with polyethylene. JP-A-61-253705 and JP-A-4-368717 each disclose that carbon black and/or magnesium oxide are added to a resin composition used for an insulator layer.

However, if a filler, such as carbon black or magnesium oxide, is added to the conventional electrically insulating resin composition, another problem arises: the impulse breakdown strength decreases. Modification of the resin composition by maleic anhydride does not arise a problem of the impulse breakdown strength, but the modification fails to give a satisfactory property to the direct-current breakdown strength.

DISCLOSURE OF INVENTION

According to the present invention there are provided the following means:

(1) An insulated electric power cable having an insulator layer formed by extrusion-coating and cross-linking a cross-linkable resin composition, which comprises a polyolefin blended with a total of 0.05 to 0.4 parts by mass of at least one compound selected from the group consisting of bis(3-ethyl-5-methyl-4-maleimidophenyl)methane, 2,2-bis[4-(4-maleimidophenoxy)phenyl]propane, N,N'-m-phenylenebismaleimide, N,N'-(4,4'-diphenylmethane) bismaleimide, and a compound represented by the following formula (1), based on 100 parts by mass of the polyolefin, and a prescribed amount of an organic peroxide cross-linking agent:

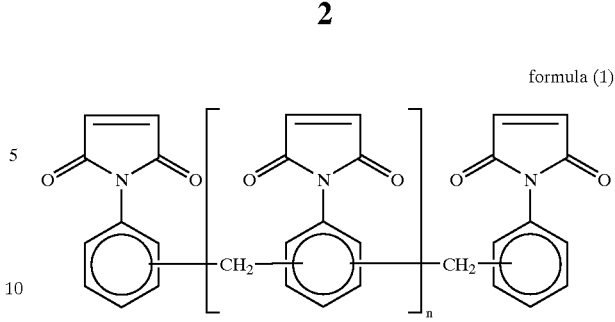

formula (1)

wherein n is an integer of 1 or more.

(2) The insulated electric power cable described in the preceding item (1), wherein the organic peroxide cross-linking agent is a compound for which 1-hour half-life temperature is at least 140° C.

(3) The insulated electric power cable described in the preceding item (1), or (2), wherein a prescribed amount of an anti-scorching agent is further added to the cross-linkable resin composition.

(4) The insulated electric power cable described in any of the preceding items (1) to (3), wherein the cable is a direct-current electric power cable.

Other and further features, and advantages of the invention will appear more fully from the following description.

BEST MODE FOR CARRYING OUT THE INVENTION

The present invention is explained in detail below.

The present inventors have found that an insulated electric power cable (preferably a direct-current power cable) which is excellent in not only both impulse breakdown strength and a direct-current breakdown strength but also extrusion property of the insulating layer when the cable is produced, can be provided, by using as an insulator layer formed by extrusion-coating and cross-linking a cross-linkable resin composition, which comprises a polyolefin blended with a total of 0.05 to 0.4 parts by mass of at least one compound selected from the group consisting of bis(3-ethyl-5-methyl-4-maleimidophenyl)methane, 2,2-bis[4-(4-maleimidophenoxy)phenyl]propane, N,N'-m-phenylenebismaleimide, N,N'-(4,4'-diphenylmethane) bismaleimide, and a compound represented by the foregoing formula (1), based on 100 parts by mass of the polyolefin, and a prescribed amount of an organic peroxide cross-linking agent.

The insulating layer for cable according to the present invention can be formed by extrusion-coating and then heating under pressure the above-mentioned cross-linkable resin composition which comprises a polyolefin blended with at least one compound selected from the group consisting of bis(3-ethyl-5-methyl-4-maleimidophenyl) methane, 2,2-bis[4-(4-maleimidophenoxy)phenyl]propane, N,N'-m-phenylenebismaleimide, N,N'-(4,4'-diphenylmethane) bismaleimide and the compound represented by the foregoing formula (1), and an organic peroxide cross-linking agent. The cross-linkable resin composition may be mixed with additives such as anti-aging agent, if necessary. Further, the cross-linkable resin composition may be mixed with a compound which is generally called an anti-scorching agent, so that the scorch occurring at the time of extrusion molding of the resin composition can be prevented.

Examples of polyolefin used in the present invention include a high or medium pressure polyethylene, a low pressure polyethylene, a very low density polyethylene, a linear low density polyethylene, polypropylene, polybutene, polypentene, an ethylene/propylene copolymer, an ethylene/α-olefin copolymer, an ethylene/vinyl acetate copolymer, an ethylene/ethylacrylate copolymer, an ethylene/styrene copolymer, and other copolymers.

At least one compound selected from the group consisting of bis(3-ethyl-5-methyl-4-maleimidophenyl)-methane, 2,2-bis[4-(4-maleimidophenoxy)phenyl]propane, N,N'-m-phenylenebismaleimide, N,N'-(4,4'-diphenylmethane) bis-maleimide and the compound represented by the foregoing formula (1) is used in a total of 0.05 to 0.4 parts by mass, preferably 0.1 to 0.3 parts by mass, based on 100 parts by mass of polyolefin. If the blending amount of this compound is too small, enhancement of a direct-current breakdown property is not accomplished. On the other hand, each of these compounds has two or more of ethylene bonds in a molecule. Consequently, if the blending amount of this compound is too much, progress of the cross-linking is excessively performed. Further, scorch occurs at the time of extrusion molding of the cross-linkable resin composition, which results in deterioration of both electric property and extrusion property.

In the compound represented by the above-mentioned formula (1), n is preferably an integer of 1 to 5, more preferably an integer of 1 to 2. In formula (1), the maleimido group may be substituted at optional position without any particular limitation.

In the present invention, as the above compound, N,N'-m-phenylenebismaleimide, N,N'-(4,4'-diphenyl methane) bismaleimide or the compound represented by the foregoing formula (1) is preferably used from the viewpoint that these compounds have many maleimido groups per unit mass.

N,N'-(4,4'-diphenylmethane)bismaleimide is more preferred from the viewpoint that DC property can be improved while maintaining an excellent Imp property.

Examples of the organic peroxide cross-linking agent include dicumyl peroxide, t-butylcumyl peroxide, and 1,3-bis(t-butylperoxy isopropyl)benzene. However, any other organic peroxides can be also used without limitation, so long as they are ordinarily used as a cross-linking agent. The blending amount of the cross-linking agent is preferably 0.1 to 10 parts by mass, based on 100 parts by mass of the polyolefin. If the blending amount of the cross-linking agent is too small, cross-linking is not sufficiently effected, which results in deterioration of both mechanical property and heat-resisting property of the insulating layer. On the other hand, if the blending amount of the cross-linking agent is too much, scorch occurs at the time of extrusion molding of the resin composition, which results in deterioration of electric property. As the cross-linking agent, preferably an organic peroxide for which 1-hour half-life temperature (the lowest temperature at which the half life becomes 1 hour) is at least 140° C. (preferably t-butylcumyl peroxide, 1,3-bis-(t-butylperoxyisopropyl)benzene) is selectively blended. Blending these organic peroxides can prevent the scorch occurring at the time of extrusion molding of the resin composition, so that an electric power cable having a more excellent Imp property can be provided.

The anti-aging agent (antioxidant) may be selected from generally used anti-aging agents to blend with the resin. As the anti-aging agent, phosphite-based or thioether-based anti-aging agents are preferred. Further, bis[2-methyl-4-{3-N-alkyl(12 or 14 carbon atoms)thiopropionyloxy}-5-t-butylphenyl]sulfide is especially preferred in view of anti-oxidation capacity. The blending amount of the anti-aging agent can be determined depending on the kind and the anti-oxidation capacity of the anti-aging agent to be added. Generally, the blending amount of the anti-aging agent is preferably 0.1 to 1.0 parts by mass, based on 100 parts by mass of a polyolefin.

In the present invention, the anti-scorching agent may be added to the cross-linkable resin composition. Herein, the term "anti-scorching agent" is referred to the compound having characteristics that the compound is able to capture in its molecule radicals generated from a cross-linking agent at the extrusion temperature of the insulating layer of the electric power cable, while the same compound releases the previously captured radicals at the cross-linking temperature of the insulating layer of the electric power cable. The anti-scorching agent may be properly selected from generally used anti-scorching agents to blend with the resin. For example, 2,4-diphenyl-4-methyl-1-pentene and N-cyclohexylthiophthal imide may be blended. A blending amount of the anti-scorching agent may be varied depending on the kind and the anti-scorching capacity of the anti-scorching agent to blend. The blending amount of the anti-scorching agent is not particularly limited, but preferably 0.1 to 5.0 parts by mass, based on 100 parts by mass of a polyolefin. If the blending amount of the anti-scorching agent is in excess, problems sometimes arise that a degree of cross-linking of the cable insulator after cross-linking decreases and also the heat-resisting property deteriorates, or otherwise the slip occurring at the time of extrusion makes a normal extrusion of the cable insulator difficult.

For the production of the insulated electric power cable according to the present invention, the extrusion-coating process and the cross-linking treatment in themselves may be carried out according to a usual manner.

The insulated electric power cable of the present invention can be preferably used as a high voltage direct-current power-transmission cable, since the cross-linkable resin composition that forms the insulator layer, does not deteriorate impulse-breakdown property, and it is excellent in both a direct-current breakdown property and an extrusion property at the time of extrusion of the insulator layer.

EXAMPLE

The present invention is explained in more detail based on the following examples, but the invention is not meant to be limited by these.

Examples 1 to 3

To pellets of low density polyethylene (manufactured by Mitsubishi Chemical Corporation, Density=0.92 g/cm$^3$, MI=1.0 g/10 miN, hereinafter abbreviated as "LDPE"), an organic peroxide cross-linking agent, N,N'-(4,4'-diphenylmethane)bismaleimide and an anti-aging agent were added in the proportion as shown in Table 1, and thoroughly mixed with stirring by means of a blender. The resulting mixture was supplied for the production of the electric power cable.

On the conductor having a section of 200 mm$^2$, a 1-mm thickness internal semi-conductive layer composed of ethylene/vinyl acetate copolymer (a cross-linking agent, carbon black, an antioxidant), a 3.5-mm thickness insulating layer composed of the cross-linkable resin composition shown in the above Table 1, and further thereon a 0.7-mm thickness external semi-conductive layer composed of the same materials as the internal semi-conductive layer were formed by simultaneous extrusion and coating method to prepare a cable core. The thus-obtained cable core was subjected to a cross-linking treatment under pressure and heating, in which heating is conducted at 280° C. in a nitrogen atmosphere having a pressure of 10 Kg/cm$^2$. During the treatment, cross-linking progressed due to a radical reaction in which the blended organic peroxide acts as an initiating agent. Next, according to a conventional method, the cable core was coated with a metal-shielding layer and an anticorrosive layer to prepare an electric power cable.

Comparative Examples 1 to 3

The resin compositions, in which additives were blended in the low density polyethylene in the same manner as in Examples 1 to 3, except for the proportion, as shown in Table 1, were supplied for the production of the electric power cables, respectively.

In comparative Examples 1 to 3 and Examples 4 to 7, 8 to 11 described below, electric power cables were manufactured in the same manner as in Examples 1 to 3.

Examples 4 to 7

The resin compositions, in which bis(3-ethyl-5-methyl-4-maleimidophenyl)methane, 2,2-bis[4-(4-maleimidophenoxy)phenyl]propane, N,N'-m-phenylenebismaleimide, or the compound represented by formula (1), and other additives were blended with the low density polyethylene in the same manner as in the foregoing Examples 1 to 3, except for the proportion, as shown in Table 2, were supplied for the production of the electric power cables, respectively.

Examples 8 to 11

The resin compositions, in which dicumyl peroxide, t-butyl cumyl peroxide, or 1,3-bis(t-butylperoxy isopropyl) benzene as the organic peroxide cross-linking agent, 2,4-diphenyl-4-methyl-1-pentene as the anti-scorching agent, and other additives were blended with the low density polyethylene in the same manner as in the foregoing Examples 1 to 3, except for the proportion, as shown in Table 2, were supplied for the production of the electric power cables, respectively.

(Test)

With respect to the thus-obtained electric power cables, the following evaluations (1), (2), (3) and (4) were conducted. The results which were obtained are shown in Tables 4 to 6.

(1) Direct-Current Breakdown Property

An electric power cable having an effective length of 8 m was prepared. While sending an electric current to the cable so that the conductor temperature becomes 90° C., the starting voltage was set −60 kV and then the voltage was increased by a step-up of −20 kV/10-min, to measure a breakdown voltage.

(2) Imp-Breakdown Property

An electric power cable having an effective length of 8 m was prepared. While sending an electric current to the cable so that the conductor temperature becomes 90° C., the starting voltage was set −50 kV/3-times and then the voltage was increased by a step-up of −20 kV/3-times to measure a breakdown voltage.

(3) Measurement of Degree of Cross-Linking

About 2 g of a 1-mm thickness sample strip was picked out from the middle layer of the insulating layer at the tail side of the cable. The degree of cross-linking was measured by a test method in accordance with JIS C 3005.

(4) Extrusion Property

In the course of the production of the electric power cable, the extruding resin pressure was measured at the site of a mesh with which the top of the screw of the insulating layer-extruder was equipped. The extrusion property was evaluated from a tendency to increase of the resin pressure at this point of time when 5 hours have lapsed after the start of extrusion. A criterion of the evaluation is as follows:

−: A rise in resin pressure is scarcely found.
+: A rise in resin pressure is found, but it raises no problem in the production of a long-size cable.
++: A rise in resin pressure is found, but it is possible to produce a long-size cable.
+++: A rise in resin pressure is found, and it is difficult to produce a long-size cable.

TABLE 1

|  | Example 1 | Example 2 | Example 3 | Comparative Example 1 | Comparative Example 2 | Comparative Example 3 |
|---|---|---|---|---|---|---|
| LDPE | 100 | 100 | 100 | 100 | 100 | 100 |
| Anti-aging agent *1 | 0.5 | 0.5 | 0.5 | 0.5 | 0.5 | 0.5 |
| Cross-linking agent (Dicumyl peroxide) | 1.8 | 1.8 | 1.8 | 1.8 | 1.8 | 1.8 |
| N,N'-(4,4'-diphenylmethane) bismaleimide | 0.4 | 0.1 | 0.05 | — | 0.02 | 0.5 |
| N,N'-m-phenylene bismaleimide | — | — | — | 0.5 | — | — |

Note:
*1 Antioxidant: bis[2-methyl-4-{3-n-alkylthiopropionyloxy}-5-t-butylphenyl]sulfide (the carbon number of the alkyl group was 12 or 14.) (trade name: AO23 manufactured by Asahi Denka Kogyo K.K.)

TABLE 2

|  | Example 4 | Example 5 | Example 6 | Example 7 |
|---|---|---|---|---|
| LDPE | 100 | 100 | 100 | 100 |
| Anti-aging agent *1 | 0.5 | 0.5 | 0.5 | 0.5 |

TABLE 2-continued

|  | Example 4 | Example 5 | Example 6 | Example 7 |
|---|---|---|---|---|
| Cross-linking agent (Dicumyl peroxide) | 1.8 | 1.8 | 1.8 | 1.8 |
| N,N'-m-phenylene bismaleimide | 0.1 | — | — | — |
| Compound represented by formula (1) [*2] | — | 0.1 | — | — |
| Bis(3-ethyl-5-methyl-4-maleimidophenyl)methane | — | — | 0.1 | — |
| 2,2-bis[4-(4-maleimido phenoxy)phenyl]propane | — | — | — | 0.1 |

Note:
[*2] Compound represented by formula (1): n = 1 to 2, the substitution site of a maleimido group was a meta position.

TABLE 3

|  |  | Example 8 | Example 9 | Example 10 | Example 11 |
|---|---|---|---|---|---|
| LDPE |  | 100 | 100 | 100 | 100 |
| Anti-aging agent [*1] |  | 0.5 | 0.5 | 0.5 | 0.5 |
| Cross-linking agent | Dicumyl peroxide | — | — | 1.8 | — |
|  | t-Butylcumyl peroxide | 1.8 | — | — | 1.8 |
|  | 1,3-bis(t-Butylperoxy isopropyl)benzene | — | 1.8 | — | — |
| N,N'-(4,4'-diphenylmethane) bismaleimide |  | 0.1 | 0.1 | 0.1 | 0.1 |
| 2,4-diphenyl-4-methyl-1-pentene |  | — | — | 0.5 | 0.5 |

TABLE 4

|  | Example 1 | Example 2 | Example 3 | Comparative Example 1 | Comparative Example 2 | Comparative Example 3 |
|---|---|---|---|---|---|---|
| Electric field of a direct-current breakdown (kV/mm) | −183 | −177 | −160 | −154 | −143 | −189 |
| Imp-breakdown electric field (kV/mm) | −151 | −157 | −157 | −134 | −163 | −151 |
| Degree of cross-linking (%) | 84 | 83 | 82 | 85 | 82 | 84 |
| Rise in resin pressure at the time of extrusion | ++ | ++ | + | +++ | − | +++ |

TABLE 5

|  | Example 4 | Example 5 | Example 6 | Example 7 |
|---|---|---|---|---|
| Electric field of a direct-current breakdown (kV/mm) | −183 | −171 | −177 | −171 |
| Imp-breakdown electric field (kV/mm) | −151 | −151 | −157 | −157 |
| Degree of cross-linking (%) | 84 | 83 | 83 | 83 |
| Rise in resin pressure at the time of extrusion | ++ | ++ | ++ | ++ |

TABLE 6

|  | Example 8 | Example 9 | Example 10 | Example 11 |
|---|---|---|---|---|
| Electric field of a direct-current breakdown (kV/mm) | −171 | −177 | −166 | −166 |
| Imp-breakdown electric field (kV/mm) | −157 | −163 | −163 | −163 |
| Degree of cross-linking (%) | 84 | 84 | 83 | 82 |
| Extrusion property | + | + | − | − |

As shown in Tables 1 to 6, the insulated electric power cables of Examples 1 to 11 each was excellent in both the direct-current breakdown strength and the extrusion property. Further, no scorch occurred at time of production of the electric cables of Example 1 to 11, which resulted in the cables that were also excellent in Imp breakdown strength.

On the other hand, in the electric power cable of Comparative Examples 1, scorch occurred owing to an excessive blending amount of N,N'-m-phenylene bismaleimide, which resulted in the cable that was poor in Imp breakdown strength. Consequently, in the comparative example 1, it was difficult to produce a long-size cable. Further, in Comparative Example 2, a too small blending amount of N,N'-(4,4'-diphenylmethane)bismaleimide gave a poor direct-current breakdown strength to the cable. Further, the electric power cable of Comparative Example 3 was difficult to be produced as a long-size cable, since the blending amount of N,N'-(4,4'-diphenylmethane)bismaleimide was too large.

INDUSTRIAL APPLICABILITY

The insulated electric power cable of the present invention is so excellent in a direct-current insulating property that it can be preferably used as a high voltage direct-current power-transmission cable.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An insulated electric power cable having an insulator layer formed by extrusion-coating and cross-linking a cross-linkable resin composition, which comprises a polyolefin blended with a total of 0.05 to 0.4 parts by mass of at least one compound selected from the group consisting of bis(3-ethyl-5-methyl-4-maleimidophenyl)methane, 2,2-bis[4-(4-maleimidophenoxy) phenyl]propane, N,N'-m-phenylenebismaleimide, N,N'-(4,4,'-diphenylmethane) bismaleimide, and a compound represented by the following formula (1), based on 100 parts by mass of the polyolefin, and a prescribed amount of an organic peroxide cross-linking agent:

Formula (1)

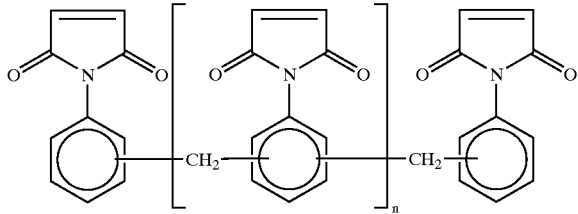

wherein n is an integer of 1 or more.

2. The insulated electric power cable according to claim 1, wherein the organic peroxide cross-linking agent is a compound for which 1-hour half-life temperature is at least 140° C.

3. The insulated electric power cable according to claim 1, wherein a prescribed amount of an anti-scorching agent is further added to the cross-linkable resin composition.

4. The insulated electric power cable according to claim 1, wherein the cable is a direct-current electric power cable.

5. An insulated electric power cable carrying direct current and having an insulator layer formed by extrusion-coating and cross-linking a cross-linkable resin composition, which comprises a polyolefin blended with a total of 0.05 to 0.4 parts by mass of at least one compound selected from the group consisting of bis(3-ethyl-5-methyl-4-maleimidophenyl)methane, 2,2-bis[4-(4-maleimidophenoxy) phenyl]propane, N,N'-m-phenylenebismaleimide, N,N'-(4,4'-diphenylmethane) bismaleimide, and a compound represented by the following formula (1), based on 100 parts by mass of the polyolefin, and a prescribed amount of an organic peroxide cross-linking agent:

Formula (1)

wherein n is an integer of 1 or more.

* * * * *

UNITED STATES PATENT AND TRADEMARK OFFICE
CERTIFICATE OF CORRECTION

PATENT NO.    : 6,780,906 B2
DATED         : August 24, 2004
INVENTOR(S)   : Takahiro Sakurai and Toshiya Tanaka It is certified that error appears in the above-identified patent and that said Letters Patent is hereby corrected as shown below:

<u>Column 9,</u>
Line 20, please delete "(4,4,'-dipenylmethane)" and insert therefore
-- (4,4'-diphenylmethane) --.

Signed and Sealed this

Eleventh Day of October, 2005

JON W. DUDAS
*Director of the United States Patent and Trademark Office*